United States Patent
Jiang et al.

(10) Patent No.: US 12,227,648 B2
(45) Date of Patent: Feb. 18, 2025

(54) ARTICLES AND STRUCTURES WITH COLORABLE ANTI-STATIC POLYETHERIMIDE BLENDS

(71) Applicant: SHPP GLOBAL TECHNOLOGIES B.V., Bergen op Zoom (NL)

(72) Inventors: Xiaoming Jiang, Shanghai (CN); Yun Zheng, Shanghai (CN); Yunan Cheng, Shanghai (CN)

(73) Assignee: SHPP Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 18/562,984

(22) PCT Filed: May 27, 2022

(86) PCT No.: PCT/IB2022/055025
§ 371 (c)(1),
(2) Date: Nov. 21, 2023

(87) PCT Pub. No.: WO2022/249150
PCT Pub. Date: Dec. 1, 2022

(65) Prior Publication Data
US 2024/0254334 A1    Aug. 1, 2024

(30) Foreign Application Priority Data
May 28, 2021   (EP) .................................... 21176749

(51) Int. Cl.
*C08L 79/08*   (2006.01)

(52) U.S. Cl.
CPC ........... *C08L 79/08* (2013.01); *C08L 2203/20* (2013.01); *C08L 2205/03* (2013.01); *C08L 2205/035* (2013.01)

(58) Field of Classification Search
CPC ................ C08L 79/08; C08L 2203/20; C08L 2205/03; C08L 2205/035; C08L 2201/04; C08L 2666/86; C08L 67/00; C08L 23/0876; C08K 5/0075; C08K 2201/019
See application file for complete search history.

(56) References Cited

U.S. PATENT DOCUMENTS

| | | |
|---|---|---|
| 3,875,116 A | 4/1975 | Heath et al. |
| 4,069,278 A | 1/1978 | Borman et al. |
| 4,230,066 A | 10/1980 | Lents |
| 4,548,997 A | 10/1985 | Mellinger et al. |
| 4,629,759 A | 12/1986 | Rock |
| 4,690,997 A | 9/1987 | Cella et al. |
| 4,808,686 A | 2/1989 | Cella et al. |
| 4,816,527 A | 3/1989 | Rock |
| 5,601,679 A * | 2/1997 | Mulcahy ................ B29C 51/12 264/510 |
| 5,916,997 A | 6/1999 | Webb et al. |
| 6,265,522 B1 | 7/2001 | Brunelle et al. |
| 6,284,839 B1 | 9/2001 | Fahey et al. |
| 6,291,589 B1 | 9/2001 | Brunelle et al. |
| 6,294,647 B1 | 9/2001 | Brunelle et al. |
| 6,310,145 B1 | 10/2001 | Puyenbroek et al. |
| 6,355,723 B1 | 3/2002 | van Baal et al. |
| 6,559,270 B1 | 5/2003 | Siclovan et al. |
| 6,861,482 B2 | 3/2005 | Brunelle et al. |
| 6,919,422 B2 | 7/2005 | Gallucci et al. |
| 7,041,773 B2 | 5/2006 | Gallucci et al. |
| 7,253,230 B2 * | 8/2007 | Damman ................ C08L 67/02 525/66 |
| 2004/0039096 A1 | 2/2004 | Patel |
| 2009/0247039 A1 | 10/2009 | Amarasekera et al. |
| 2018/0265655 A1 * | 9/2018 | Sanner .................... B32B 15/08 |
| 2019/0169429 A1 | 6/2019 | Moniruzzaman et al. |

FOREIGN PATENT DOCUMENTS

| | | | |
|---|---|---|---|
| CN | 104629029 A | 5/2015 | |
| CN | 110591065 A | 12/2019 | |
| EP | 0187416 A2 | 7/1986 | |
| EP | 0466061 A2 | 1/1992 | |
| EP | 3158003 B1 * | 11/2019 | ............. C08K 3/013 |
| JP | H07-316421 A | 12/1995 | |
| JP | 2002-155152 A | 5/2002 | |
| JP | 2010-059218 A | 3/2010 | |
| WO | WO-2006020221 A1 * | 2/2006 | ............. B82Y 30/00 |

OTHER PUBLICATIONS

Engage 8401 DOW product sheet Rev. date Sep. 2011 (Year: 2011).*
International Search Report and Written Opinion mailed Sep. 8, 2022 in PCT/IB2022/055025 (11 pgs.).
Chapter II International Preliminary Report on Patentability mailed Aug. 8, 2023 in PCT/IB2022/055025 (5 pgs.).

* cited by examiner

*Primary Examiner* — Jane L Stanley
(74) *Attorney, Agent, or Firm* — Quicker Law, LLC

(57) ABSTRACT

Disclosed herein are polymer compositions comprising from about 1 wt. % to about 99 wt. % of a polyetherimide resin; from about 1 wt. % to about 70 wt. % of a crystalline polyester resin; from about 0.1 wt. % to about 50 wt. % of an inherently dissipative polymer; and from about 0.001 wt. % to about 10 wt. % of a transesterification inhibitor. The combined weight percent value of all components does not exceed about 100 wt. %, and all weight percent values are based on the total weight of the polymer composition. The polymer composition may exhibit a surface resistivity of from $1 \times 10^9$ ohms to $9 \times 10^{10}$ ohms when measured in accordance with ASTM D257.

19 Claims, 6 Drawing Sheets

Table 1. Components of the compositions

| Description | Item | Source |
|---|---|---|
| Ultem™ 1010; MVR of 13 cm³/10 min at 340 °C/5.0 kg | PEI | SABIC |
| PBT315 | PBT | Changchun Plastic |
| PET BC112; intrinsic viscosity is 0.84 dl/g (IRC0041), density is 0.838 g/cm³ (ASTM D 1895; polyethylene terephthalate | PET | SABIC |
| Pentaerythritol Tetrastearate (PETS) | Mold Release | FACL |
| Pelectron AS; melt flow rate 30 g/10 min at 215 °C/2.16 kg; surface resistivity of 1 × 10⁶ - 1 × 10⁷ Ohms/square, melting point of 195 °C | IDP1 | Sanyo Chemical Industries |
| TPA 6060; surface resistivity of 1 × 10⁶ Ohms/square, melting point of 185 °C, density of 1.13 g/cm³ | IDP2 | Suyua Technology |
| Sanyo transesterification inhibitor | BN-1; Stabilizer | Sanyo Chemical Industries |

FIG. 1

Table 2. Compounding conditions for colorable ESD Polycarbonate grades

| | Output (kg/hr) | Screw (RPM) | Vacuum (bar) | Torque (%) | Barrel temp.°C | Die temp.°C |
|---|---|---|---|---|---|---|
| Setting condition | 40 | 400 | -0.08 | 71 | 240 | 250 |

FIG. 2

Table 3. Injection molding conditions for colorable ESD Polycarbonate grades

| Molding parameters | unit | Value |
|---|---|---|
| Pre-drying time | Hour | 6 |
| Pre-drying temp | °C | 70 |
| Hopper temp | °C | 70 |
| Zone 1 temp | °C | 240 |
| Zone 2 temp | °C | 240 |
| Zone 3 temp | °C | 240 |
| Nozzle temp | °C | 240 |
| Mold temp | °C | 50 |

FIG. 3

Table 4. Testing standards

| | |
|---|---|
| Heat deflection temperature, HDT | ASTM D 648, 0.45MPa, 3.2 mm |
| Notched Izod Impact (NII) | ASTM D256, room temperature |
| Surface Resistivity (SR) | ASTM D257 |

FIG. 4

Table 5. Formulations and surface resistivity

| | | C-1 | EX-1 | EX-2 | EX-3 | EX-4 |
|---|---|---|---|---|---|---|
| PET | % | | | 10 | | |
| PETS | % | | 0.3 | | 0.3 | 0.3 |
| IDP1 | % | | 21 | 21 | | 21 |
| IDP2 | | | | | 21 | |
| Ultem™ 1010 | % | | 68.5 | 68.5 | 68.7 | 63.7 |
| PEI 1000 (MVR 13 cm3/10 min at 360 °C/5.0 kg) | % | 79 | | | | |
| Carbon fiber (Sigrafil C30 S006) | | 21 | | | | |
| PBT 315 | % | | 10 | | 10 | 15 |
| Sanyo transesterification inhibitor | % | | 0.2 | 0.2 | | |
| SR - ASTM D257 | ohms | | 2.0 E+10 | 1.1 E+10 | 4.3 E+10 | 2.3 E+9 |
| VR - ASTM D257 | Ohms *cm | | 1.0 E+9 | 7.8 E+8 | 2.8 E+9 | 1.3 E+9 |
| ASTMD648, 0.45 MPa, 3.2 mm | °C | | 153 | 158 | 145 | 140 |
| ASTM D 256, 23 °C | J/m | | 35.8 | 30.1 | 38.7 | 61.6 |
| CIE 1976 color space | / | 26 | 82.6 | | | |
| ISO1133, 2.16 kg, 240 °C, 300 s | cc/10 min | cannot flow below 330 °C | | | | 1.52 |

FIG. 5

ARTICLES AND STRUCTURES WITH COLORABLE ANTI-STATIC POLYETHERIMIDE BLENDS

CROSS-REFERENCE TO RELATED APPLICATION

This application is the National Stage of International Application No. PCT/IB2022/055025 filed May 27, 2022, which claims priority to and the benefit of European Application No. 21176749.6 filed May 28, 2021, the disclosures of which are incorporated herein by this reference in their entireties.

TECHNICAL FIELD

The disclosure relates to electrostatic dissipative polyetherimide blends, particularly electrostatic dissipative polyetherimide blends that are colorable.

BACKGROUND

Electrostatic discharge can be detrimental to electronic components, resulting in failures, reduced reliability and increased costs, and latent component failures in deployed equipment. Polymeric materials are typically good insulators but can become conductive or static-dissipative upon the addition of conductive fillers, such as, metallic fillers, non-conductive fillers coated with metallic coatings, or electrically conductive non-metallic fillers, as well as carbon based fillers such as carbon nanotubes, carbon fibers, and carbon black. The addition of such materials creates a network of interconnecting particles within the polymer matrix, allowing electric charges to conduct through the insulating polymer. Electrostatic dissipative (ESD) and anti-static materials are widely used in various fields like semi-conductors, consumer electronics and industrial constructions to prevent electro-static accumulation. These two types are defined by their surface resistivity (SR), for which the former is in-between $1 \times 10^6$ to $1 \times 10^9$ ohms and the latter is $1 \times 10^{10}$ to $1 \times 10^{12}$ ohms. Classical ESD materials are generally not colorable as limited by the conductive carbon fillers' natural blackness or darkness. Conversely, those compounds doped with conventional inherently dissipative polymers (IDP) (in order to achieve electrostatic behavior) cannot reach surface resistivity as low as $1 \times 10^9$ ohms notwithstanding their colorless appearance. There remains a need in the art for materials having sufficiently low surface resistivity (at least as low as $1 \times 10^9$ Ohms), while also maintaining a colorable appearance.

SUMMARY

Aspects of the present disclosure relate to a polymer composition comprising from about 1 wt. % to about 99 wt. % of a polyetherimide resin; from about 1 wt. % to about 70 wt. % of a crystalline polyester resin; from about 0.1 wt. % to about 50 wt. % of an inherently dissipative polymer; and from about 0.001 wt. % to about 10 wt. % of a transesterification inhibitor, wherein the polymer composition exhibits a surface resistivity of from $1 \times 10^9$ ohms to $9 \times 10^{10}$ ohms when measured in accordance with ASTM D257 and a volume resistivity of from $1 \times 10^8$ to $9 \times 10^9$ ohms centimeters (ohms cm) in accordance with ASTM D257, and wherein the combined weight percent value of all components does not exceed about 100 wt. %, and all weight percent values are based on the total weight of the polymer composition.

In yet other aspects, the present disclosure relates to a method of forming a composition including a polyetherimide polymer, a crystalline polyester, an inherently dissipative polymer additive, and a transesterification inhibitor.

In certain aspects, the disclosure relates to a method of forming an article including the steps of molding an article from the polymer composition described herein.

BRIEF DESCRIPTION OF THE FIGURES

The accompanying figures, which are incorporated in and constitute a part of this specification, illustrate several aspects and together with the description serve to explain the principles of the disclosure.

FIG. 1 presents Table 1 showing components of the compositions prepared.

FIG. 2 presents Table 2 showing the compounding conditions for colorable ESD polycarbonate grades.

FIG. 3 presents Table 3 showing the injection molding conditions for colorable ESD polycarbonate grades.

FIG. 4 presents Table 4 showing the testing standards used.

FIG. 5 presents Table 5 showing the formulations and surface resistivity for samples C-1, EX-1, EX-2, EX-3, and EX-4.

DETAILED DESCRIPTION

Figure 6B:
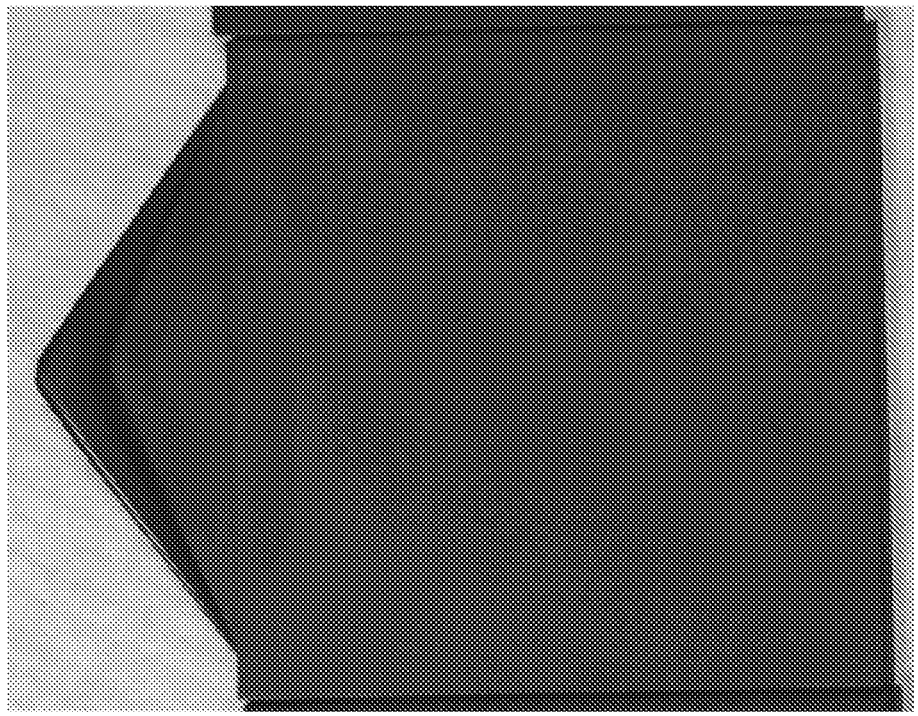
FIG. 6B shows an image of a molded plate comprising sample C-3 a conventional conductive carbon black filled polycarbonate.

The control of electrostatic discharges is increasingly challenging given the complexity and sensitivity of microelectronic devices. Even at low voltages, such electrostatic discharges may severely damage sensitive devices. Electrostatic dissipative (ESD) and anti-static materials are widely used in various fields like semi-conductors, consumer electronics and industrial constructions to prevent electro-static accumulation. These two types are defined by their surface resistivity (SR), for which the former is in-between $1 \times 10^6$ to $1 \times 10^9$ ohms and the latter is $1 \times 10^{10}$ to $1 \times 10^{12}$ ohms. Thus, by using a variety of different static dissipative (ESD) materials, accumulation of electrostatic charges on plastic during manufacture or use can be avoided.

However, the incorporation of static dissipative materials (antistatic agents) into a variety of different substrates or polymer resin matrices has its own limitations. Polymers generally require high temperature processing, which may damage or destroy the antistatic agents, thus rendering their ESD properties ineffective. Furthermore, many higher molecular weight ESD reagents are not miscible with certain substrates or matrix polymers used. The use of antistatic agents may also only provide temporary ESD properties to the compositions used. Performance and effectiveness are also limited by environmental conditions such as humidity. Conventional ESD materials also include conductive filler such as carbon fiber, conductive carbon black, graphite, graphene, and carbon nanotubes, which generally also impart a dark color to the composition. Accordingly, classical ESD materials are not readily colorable as the color space may be limited by the conductive carbon fillers' natural blackness. Moreover, while compounds doped by conventional inherently dissipative polymers (IDP) are not darkened by the additive, they typically cannot reach surface resistivity values as low as $1 \times 10^9$ ohms. Formulations of the present disclosure however achieve both ESD and broad coloring potential while also maintaining desirable electrical, impact, and processing performance.

The present disclosure provides compositions of colorable electrostatic dissipative (ESD) compounds comprising an inherently dissipative polymer (IDP) doped polyetherimide (PEI) and a crystalline polymer such as poly butylene terephthalate (PBT) or poly(1,4-cyclohexylenedimethylene 1,4-cyclohexylenedicarboxylate) (PCCD). The compositions may provide low surface resistivity (SR) at least as low as $1\times10^9$ ohms, making them sufficiently colorable and suitable for ESD applications. The impact, thermal and flow properties are also desirable for manufacturing.

In an aspect, the disclosed compositions comprise from about 1 wt. % to about 99 wt. % of a polyetherimide resin; from about 1 wt. % to about 70 wt. % of a crystalline polyester resin; from about 0.1 wt. % to about 50 wt. % of an inherently dissipative polymer; and from about 0.001 wt. % to about 10 wt. % of a transesterification inhibitor. The polymer composition may exhibit a surface resistivity less than $9\times10^{10}$ Ohms when measured in accordance with ASTM D257, or the composition may exhibit a surface resistivity of from $1\times10^9$ ohms to $9\times10^{10}$ ohms. The composition may further exhibit a volume resistivity of less than $9\times10^9$ ohms cm, or the composition may exhibit a volume resistivity of from $1\times10^8$ to $9\times10^9$ ohms cm when tested in accordance with ASTM D257. Further, the combined weight percent value of all components does not exceed about 100 wt. %, and all weight percent values are based on the total weight of the polymer composition. Compositions of the present disclosure comprising polyetherimide, namely an aromatic polyetherimide, thus maintain a high heat deflection temperature (HDT, greater than 140° C.), even when in the presence of further polymers such as PBT and IDP. The disclosed compositions also maintain these HDT values while also achieving the claimed values for surface resistivity (as low as a magnitude of $10^9$ ohms) and volume resistivity (as low as a magnitude of $10^8$ ohms cm).

Before the present compounds, compositions, articles, systems, devices, and/or methods are disclosed and described, it is to be understood that they are not limited to specific synthetic methods unless otherwise specified, or to particular reagents unless otherwise specified, as such, can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim. Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the embodiments "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate" includes mixtures of two or more polycarbonate polymers. As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optional additives" means that the additives can or cannot be included and that the description includes polymer compositions that both include and that do not include additional additives.

In one aspect, "substantially free of" may refer to less than 0.5 wt. % or less than about 0.5 wt. % present in a given composition or component. In another aspect, substantially free of can be less than 0.1 wt. %, or less than about 0.1 wt. %. In another aspect, substantially free of can be less than 0.01 wt. %, or less than about 0.01 wt. %. In yet another aspect, substantially free of can be less than 100 parts per million (ppm), or less than about 100 ppm. In yet another aspect, substantially free can refer to an amount, if present at all, below a detectable level. Substantially free of or free of may further refer to a component that has not been added or incorporated into the composition.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Polymer Base Resin

In an aspect, the polymer composition may comprise a polymer resin. In various aspects, the polymer base resin can include a thermoplastic resin or a thermoset resin. The thermoplastic resin can include polypropylene, polyethylene, ethylene based copolymer, polyamide, polycarbonate, polyester, polyoxymethylene (POM), polybutylene terephthalate (PBT), polyethylene terephthalate (PET), polycyclohexylenedimethylene terephthalate (PCT), liquid crystal polymers (LPC), polyphenylene sulfide (PPS), polyphenylene ether (PPE), polyphenylene oxide-polystyrene blends, polystyrene, high impact modified polystyrene, acrylonitrile-butadiene-styrene (ABS) terpolymer, acrylic polymer, polyetherimide (PEI), polyurethane, polyetheretherketone (PEEK), polylactic acid (PLA) based polymers, poly ether sulphone (PES), and combinations thereof. The thermoplastic resin can also include thermoplastic elastomers such as polyamide and polyester based elastomers. The base substrate can also include blends and/or other types of combination of resins described above. In various aspects, the polymer base resin can also include a thermosetting polymer. Appropriate thermosetting resins can include phenol resin, urea resin, melamine-formaldehyde resin, urea-formaldehyde latex, xylene resin, diallyl phthalate resin, epoxy resin, aniline resin, furan resin, polyurethane, or combinations thereof.

In an aspect, the polymer composition may comprise a polymer resin. In various aspects, the polymer base resin can include a thermoplastic resin or a thermoset resin. The thermoplastic resin can include polypropylene, polyethylene, ethylene based copolymer, polyamide, polycarbonate, polyester, polyoxymethylene (POM), polybutylene terephthalate (PBT), polyethylene terephthalate (PET), polycyclohexylenedimethylene terephthalate (PCT), liquid crystal polymers (LPC), polyphenylene sulfide (PPS), polyphenylene ether (PPE), polyphenylene oxide-polystyrene blends, polystyrene, high impact modified polystyrene, acrylonitrile-butadiene-styrene (ABS) terpolymer, acrylic polymer, polyetherimide (PEI), polyurethane, polyetheretherketone (PEEK), polylactic acid (PLA) based polymers, poly ether sulphone (PES), and combinations thereof. The thermoplastic resin can also include thermoplastic elastomers such as polyamide and polyester based elastomers. The base substrate can also include blends and/or other types of combination of resins described above. In various aspects, the polymer base resin can also include a thermosetting polymer. Appropriate thermosetting resins can include phenol resin, urea resin, melamine-formaldehyde resin, urea-formaldehyde latex, xylene resin, diallyl phthalate resin, epoxy resin, aniline resin, furan resin, polyurethane, or combinations thereof.

In specific aspects the polymer composition comprises a polycarbonate, specifically a polycarbonate copolymer. As used herein, "polycarbonate" refers to an oligomer or polymer including residues of one or more dihydroxy compounds, for example, dihydroxy aromatic compounds, joined by carbonate linkages; it also encompasses homopolycarbonates, copolycarbonates, and (co)polyester carbonates. The terms "residues" and "structural units", used in reference to the constituents of the polymers, are synonymous throughout the specification. The terms "BisA," "BPA," or "bisphenol A," which can be used interchangeably, as used herein refers to a compound having a structure represented by formula (1):

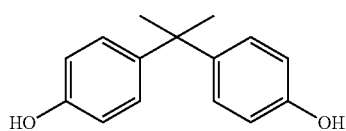

(1)

BisA can also be referred to by the name 4,4'-(propane-2,2-diyl)diphenol; p,p'-isopropylidenebisphenol; or 2,2-bis(4-hydroxyphenyl)propane. BisA has the CAS #80-05-7.

Combinations of the polycarbonate with other thermoplastic polymers, for example combinations of homopolycarbonates, copolycarbonates, and polycarbonate copolymers with polyesters, can be used. Useful polyesters include, for example, poly(alkylene dicarboxylates), liquid crystalline polyesters, and polyester copolymers. The polyesters described herein can generally be completely miscible with the polycarbonates when blended.

In further examples, a polycarbonate of the polymer base resin can include a branched polycarbonate. An exemplary branching agent can include, but is not limited to 1,1,1-tris(4-hydroxyphenyl)ethane (THPE). As a further example, the branched polycarbonate resin may be endcapped with an appropriate end-capping agent, such as for example, p-cyanolphenol (known as HBN).

The polymer resin may include a polycarbonate copolymer including units derived from BPA, or a mixture of one or more polycarbonate copolymers including units derived from BPA. In a specific example, the polymer resin can include a polycarbonate copolymer having units derived from BPA and a poly(aliphatic ester)-polycarbonate copolymer derived from sebacic acid.

In some aspects, a polycarbonate copolymer component including a polyester-polycarbonate copolymer. As further described herein, polyesters have repeating units of the following formula (A):

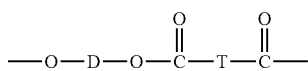

(A)

wherein T is a residue derived from a terephthalic acid or chemical equivalent thereof, and D is a residue derived from polymerization of an ethylene glycol, butylene diol, specifically 1,4-butane diol, or chemical equivalent thereof.

In a specific aspect, the polyester unit is derived from the reaction of isophthalic acid, terephthalic acid, and resorcinol (also known as an ITR resin). The polyester unit has the following structure (B):

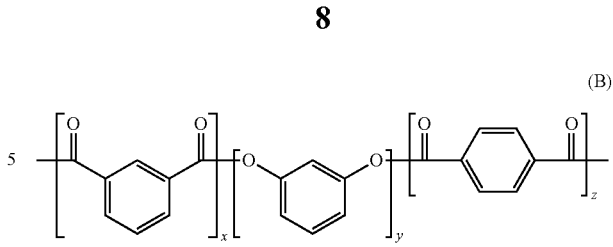

(B)

where x corresponds to the molar ratio of the isophthalate, y corresponds to the molar ratio of the resorcinol, and z corresponds to the molar ratio of the terephthalate; x, y, and z adding to 100 percent of the polyester unit. The concentration of polyester (ITR) resin may be least 5%, based on the number of moles in the polymer. In further aspects, the polyester and polycarbonate are used in a molar ratio of from about 5:95 to about 40:60 or more particularly from about 5:95 to about 35:65, depending on the properties desired. The polyester-polycarbonates may have a weight average molecular weight of from about 1,500 to about 100,000 or more particularly from about 2,000 to about 40,000. The polyester-polycarbonate polymer can be a copolymer, especially a block copolymer.

Specifically, the polyester unit of a polyester-polycarbonate may be derived from the reaction of a combination of isophthalic and terephthalic diacids (or derivatives thereof with resorcinol, bisphenol A, or a combination comprising one or more of these, wherein the molar ratio of isophthalate units to terephthalate units is 91:9 to 2:98, specifically 85:15 to 3:97, more specifically 80:20 to 5:95, and still more specifically 70:30 to 10:90. In case the polycarbonate comprises units derived from resorcinol and/or bisphenol A, the molar ratio of resorcinol carbonate units to bisphenol A carbonate units of 0:100 to 99:1, and the molar ratio of the mixed isophthalate-terephthalate polyester units to the polycarbonate units in the polyester-polycarbonate can be 1:99 to 99:1, specifically 5:95 to 90:10, more specifically 10:90 to 80:20. Where a blend of polyester-polycarbonate with polycarbonate is used, the ratio of polycarbonate to polyester-polycarbonate in the blend can be, respectively, 1:99 to 99:1, specifically 10:90 to 90:10.

In a specific aspect, the polycarbonate copolymer may comprise a resorcinol based aryl polyester or a resorcinol based polyester carbonate polymer. ITR (isophthalate terephthalate resorcinol) Resorcinol-based aryl polyesters and "resorcinol-based polyaryl esters" and "resorcinol-based polyarylate" shall all mean a copolymer comprising resorcinol moieties and resorcinol-based ester linkages and possibly other linkages also such as resorcinol-based polycarbonate linkages. These terms are meant to include both polyesters only containing ester bonds and polyester carbonates in instances where resorcinol-based polycarbonate linkages are present. Thus, the polyester-polycarbonate copolymer may comprise repeating structural carbonate units of bisphenol A and repeating structural ester units, which may be any copolymer of BPA polycarbonate and resorcinol phthalate (ITR) (C), and such as (D).

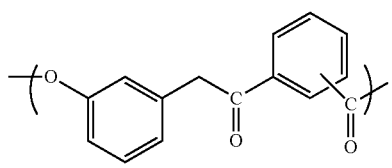

(C)

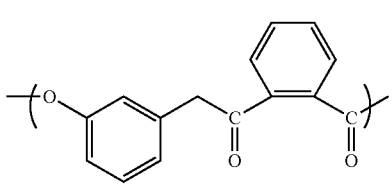

(D)

These copolycarbonates may be synthesized by a skilled artisan, or can be obtained commercially, for example, SABIC LEXAN™ SLX resin. LEXAN™ SLX resin is ITR-polycarbonate copolymer with molecular weight 20,000-30,000, refractive index around 1.59-1.603.

As an example, a resorcinol-based polyaryl ester may comprise both carbonate linkages (for example, between a resorcinol moiety and a bisphenol A moiety) and ester linkages (for example, between a resorcinol moiety and an isophthalic acid moiety). In aspects of the present disclosure, the composition comprises ITR-BPAPC.

In some instances, the resorcinol-based polyarylate resin may contain at least about 40 mole % of moieties derived from resorcinol. The resorcinol moieties can be introduced as the reaction product of resorcinol, or functionalized resorcinol, with an aryl dicarboxylic acid or aryl dicarboxylic acid derivatives suitable for the formation of aryl ester linkages with the resorcinol. Suitable dicarboxylic acid derivatives include, for example, carboxylic acid halides, carboxylic acid esters and carboxylic acid salts.

The resorcinol-based polyarylate may further contain carbonate linkages derived from reaction of a bisphenol and a carbonate forming species, such as phosgene, making the resorcinol-based polyarylate a polyester carbonate copolymer. In another embodiment of the invention, resorcinol polyarylate carbonate copolymers will comprise the reaction products of iso- and terephthalic acid, resorcinol and optionally, bisphenol A and phosgene. In one aspect, the resorcinol polyester carbonate copolymer will be made in such a way that the number of bisphenol dicarboxylic ester linkages is minimized, for example by pre-reacting the resorcinol with the dicarboxylic acid to form an aryl polyester block and then reacting the aryl polyester block with the bisphenol and carbonate moiety to form the polycarbonate portion of the copolymer. Examples of resorcinol ester containing polymers can be found in U.S. Pat. Nos. 6,861,482, 6,559,270, 6,265,522, 6,294,647, 6,291,589 and 5,916,997.

In other examples, the polycarbonate copolymer may include a polycarbonate-dimethyl bisphenol cyclohexane copolymer (DMBPC) including at least 50 mol % dimethyl bisphenol cyclohexane monomer. DMBPC has the formula (E):

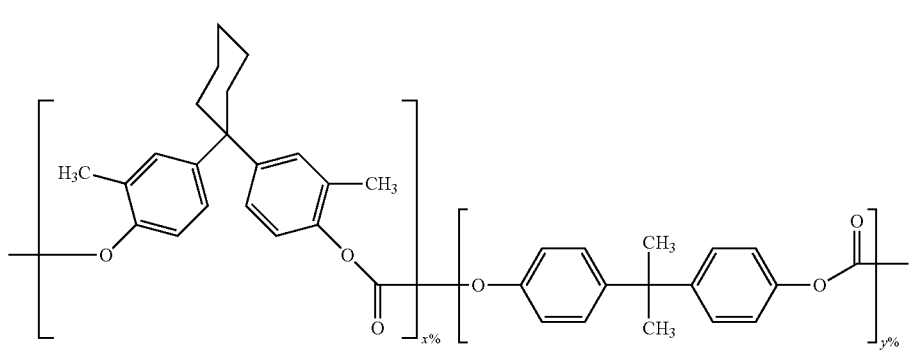

(E)

wherein x and y represent the molar ratio of dimethyl bisphenol cyclohexane monomer and polycarbonate monomer, respectively. Thus when x is 50 y is also 50 and the copolymer includes 50 mol % dimethyl bisphenol cyclohexane monomer and 50 mol % polycarbonate monomer. In some aspects x is from 20 to 100.

In yet further aspects, the polyester-polycarbonate copolymers contain repeating units of formula (A), above, wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one aspect, D is a $C_{2-6}$ alkylene radical. In another embodiment, D is derived from an aromatic dihydroxy compound of formula (F):

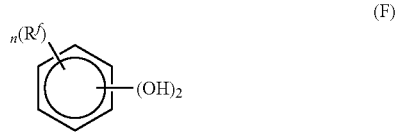

(F)

wherein each $R^f$ is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is 91:1 to 2:98. In another specific embodiment, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

Polysiloxane-polycarbonate copolymers may be useful polycarbonate copolymers and may include 50 wt. % to 99 wt. % of carbonate units and 1 wt. % to 50 wt. % siloxane units. Within this range, the polyorganosiloxane-polycarbonate copolymer can include 70 wt. %, to 98 wt. 00 more specifically 75 wt. % to 97 wt. % of carbonate units and 2 wt. % to 30 wt. %, more specifically 3 wt. % to 25 wt. % siloxane units.

In one aspect, the polysiloxane-polycarbonate copolymer can include 10 wt % or less, specifically 6 wt % or less, and more specifically 4 wt % or less, of the polysiloxane based on the total weight of the polysiloxane-polycarbonate copolymer, and can generally be optically transparent and are commercially available under the designation EXL-T from SABIC. In another aspect, the polysiloxane-polycarbonate copolymer can include 10 wt % or more, specifically 12 wt % or more, and more specifically 14 wt % or more, of the polysiloxane copolymer based on the total weight of the polysiloxane-polycarbonate copolymer, are generally optically opaque and are commercially available under the trade designation EXL-P from SABIC.

Polyorganosiloxane-polycarbonates can have a weight average molecular weight of 2,000 Daltons to 100,000 Daltons, specifically 5,000 to 50,000 Daltons as measured by gel permeation chromatography using a crosslinked styrene-divinyl benzene column, at a sample concentration of 1 milligram per milliliter, and as calibrated with polycarbonate standards.

The polyorganosiloxane-polycarbonates can have a melt volume flow rate, measured at 300 degrees Celsius (° C.) per 1.2 kilogram (kg), of 1 to 50 cubic centimeters per 10 minutes (cm³/10 min), specifically 2 to 30 cm³/10 min. Mixtures of polyorganosiloxane-polycarbonates of different flow properties can be used to achieve the overall desired flow property.

Non-limiting examples of polysiloxane-polycarbonate copolymers can include various copolymers available from SABIC. In an aspect, the polysiloxane-polycarbonate copolymer can contain 6% by weight polysiloxane content based upon the total weight of the polysiloxane-polycarbonate copolymer. In various aspects, the 6% by weight polysiloxane block copolymer can have a weight average molecular weight (Mw) of from about 23,000 to 24,000 Daltons using gel permeation chromatography with a bisphenol A polycarbonate absolute molecular weight standard. In certain aspects, the 6% weight siloxane polysiloxane-polycarbonate copolymer can have a melt volume flow rate (MVR) of about 10 cm³/10 min at 300° C./1.2 kg (see C9030 T, a 6% by weight polysiloxane content copolymer available from SABIC as "transparent" EXL C9030T resin polymer). In another example, the polysiloxane-polycarbonate block can include 20% by weight polysiloxane based upon the total weight of the polysiloxane block copolymer. For example, an appropriate polysiloxane-polycarbonate copolymer can be a bisphenol A polysiloxane-polycarbonate copolymer endcapped with para-cumyl phenol (PCP) and having a 20% polysiloxane content (see C9030P, commercially available from SABIC as the "opaque" EXL C9030P). In various aspects, the weight average molecular weight of the 20% polysiloxane block copolymer can be about 29,900 Daltons to about 31,000 Daltons when tested according to a polycarbonate standard using gel permeation chromatography (GPC) on a cross-linked styrene-divinylbenzene column and calibrated to polycarbonate references using a UV-VIS detector set at 264 nanometers (nm) on 1 milligram per milliliter (mg/ml) samples eluted at a flow rate of about 1.0 ml/minute. Moreover, the 20% polysiloxane block copolymer can have a melt volume rate (MVR) at 300° C./1.2 kg of 7 cm³/10 min and can exhibit siloxane domains sized in a range of from about 5 micron to about 20 micrometers (microns, μm).

The composition may comprise from about 0.1 wt. % to about 99 wt. % of a polycarbonate copolymer. The PC copolymer component may be present in the polymer composition in the range of from at least about 45 wt. % to about 85 wt. %, In further examples, the composition may comprise from about 10 wt. % to about 90 wt. % of a polycarbonate copolymer, or from about 10 wt. % to about 80 wt. % of a polycarbonate copolymer, or from about 20 wt. % to about 80 wt. % of a polycarbonate copolymer, or from about 25 wt. % to about 80 wt. % of a polycarbonate copolymer, or from about 30 wt. % to about 80 wt. % of a polycarbonate copolymer, or from about 40 wt. % to about 80 wt. % of a polycarbonate copolymer, or from about 40 wt. % to about 75 wt. % of a polycarbonate copolymer, or from about 45 wt. % to about 80 wt. % of a polycarbonate copolymer.

In various aspects, the disclosed composition may comprise at least one crystalline polyester. Crystallinity, or semi-crystallinity, of a polymer may describe a polymer having molecular chains that are organized or more tightly packed. A result, this highly organized molecular structure may provide a more a defined melting point. These polymers are anisotropic in flow, so they exhibit greater shrinkage transverse to flow rather than with the flow, which can sometimes result in some dimensional instability. There can be varying degrees of crystallinity among different materials and as well as variations among of the same material. The degree of crystallinity can affect many characteristics of the polymer. Molecular weight and branching may affect crystallinity.

The at least one crystalline polyester includes polybutylene terephthalate (PBT), polycyclohexylene dimethylene terephthalate (PCT), polyethylene terephthalate (PET), polyethylene terephthalate glycol (PETG), polycyclohexylene dimethylene terephthalate glycol (PCTG), polycyclohexylene dimethylene terephthalate acid (PCTA), copolymers thereof, or a combination thereof. In a particular aspect the at least one crystalline polyester includes polybutylene terephthalate (PBT).

Certain aspects of the composition include from about 1 wt. % to about 99 wt. % of the at least one crystalline polyester. 50 wt. % to about 97 wt. % of a thermoplastic resin, or from about 40 wt. % to about 97 wt. % of a polymer base resin, or from about 55 wt. % to about 97 wt. % of a polymer base resin, or from about 60 wt. % to about 97 wt. % of a polymer base resin, or from about 70 wt. % to about 97 wt. % of a polymer base resin, or from about 40 wt. % to about 95 wt. % of a polymer base resin, or from about 55 wt. % to about 95 wt. % of a polymer base resin, or from about 60 wt. % to about 95 wt. % of a polymer base resin, or from about 75 wt. % to about 97 wt. % of a polymer base resin.

In various aspects of the present disclosure, the thermoplastic resin may comprise a crystalline polyester. For example, the thermoplastic resin may comprise a polyalkylene ester (a polyester), such as a polyalkylene terephthalate polymer.

As provided herein, polyesters have repeating units of the following formula (A) above. Chemical equivalents of diacids include dialkyl esters, e.g., dimethyl esters, diaryl esters, anhydrides, salts, acid chlorides, acid bromides, and the like. Chemical equivalents of ethylene diol and butylene diol include esters, such as dialkylesters, diaryl esters, and the like. In addition to units derived from a terephthalic acid or chemical equivalent thereof, and ethylene glycol or a butylene diol, specifically 1,4-butane diol, or chemical equivalent thereof, other T and/or D units can be present in the polyester, provided that the type or amount of such units do not significantly adversely affect the desired properties of the thermoplastic compositions. Poly(alkylene arylates) can have a polyester structure according to formula (A), wherein T comprises groups derived from aromatic dicarboxylates, cycloaliphatic dicarboxylic acids, or derivatives thereof.

Examples of specifically useful T groups include, but are not limited to, 1,2-, 1,3-, and 1,4-phenylene; 1,4- and 1,5-naphthylenes; cis- or trans-1,4-cyclohexylene; and the like. Specifically, where T is 1,4-phenylene, the poly(alkylene arylate) is a poly(alkylene terephthalate). In addition, for poly(alkylene arylate), specifically useful alkylene groups D include, for example, ethylene, 1,4-butylene, and bis-(alkylene-disubstituted cyclohexane) including cis- and/or trans-1,4-(cyclohexylene)dimethylene.

Examples of polyalkylene terephthalate include polyethylene terephthalate (PET), poly(1,4-butylene terephthalate) (PBT), and poly(propylene terephthalate) (PPT). Also useful are poly(alkylene naphthoates), such as poly(ethylene naphthanoate) (PEN), and poly(butylene naphthanoate) (PBN). A useful poly(cycloalkylene diester) is poly(cyclohexanedimethylene terephthalate) (PCT). Combinations including at least one of the foregoing polyesters may also be used.

Copolymers including alkylene terephthalate repeating ester units with other ester groups can also be useful. Useful ester units can include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer includes greater than or equal to 50 mol % of poly(ethylene terephthalate), and abbreviated as PCTG where the polymer comprises greater than 50 mol % of poly(1,4-cyclohexanedimethylene terephthalate). Poly(cycloalkylene diester)s can also include poly(alkylene cyclohexanedicarboxylate)s. Of these, a specific example is poly(1,4-cyclohexane-dimethanol-1,4-cyclohexanedicarboxylate) (PCCD), having recurring units of formula (G):

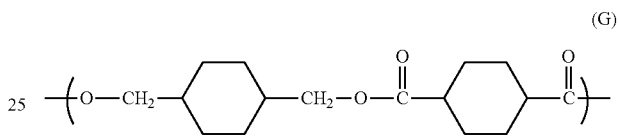

(G)

wherein, as described using formula (A), $R^2$ is a 1,4-cyclohexanedimethylene group derived from 1,4-cyclohexanedimethanol, and T is a cyclohexane ring derived from cyclohexanedicarboxylate or a chemical equivalent thereof, and can comprise the cis-isomer, the trans-isomer, or a combination comprising at least one of the foregoing isomers.

In another aspect, the composition can further comprise poly(1,4-butylene terephthalate) or "PBT" resin. PBT may be obtained by polymerizing a glycol component of which at least 70 mol %, preferably at least 80 mol %, consists of tetramethylene glycol and an acid or ester component of which at least 70 mol %, preferably at least 80 mol %, consists of terephthalic acid and/or polyester-forming derivatives thereof. Commercial examples of PBT include those available under the trade names VALOX™ 315, VALOX™ 195 and VALOX™ 176, manufactured by SABIC™, having an intrinsic viscosity of 0.1 deciliters per gram (dl/g) to about 2.0 dl/g (or 0.1 dl/g to 2 dl/g) as measured in a 60:40 phenol/tetrachloroethane mixture or similar solvent at 23 degrees Celsius (° C.) to 30° C. In one aspect, the PBT resin has an intrinsic viscosity of 0.1 dl/g to 1.4 dl/g (or about 0.1 dl/g to about 1.4 dl/g), specifically 0.4 dl/g to 1.4 dl/g (or about 0.4 dl/g to about 1.4 dl/g).

As described herein, the composition may comprise from about 0.1 wt. % to about 99 wt. % of a crystalline polyester. In further examples, the composition may comprise from about 0.1 wt. % to about 50 wt. % of a crystalline polyester, or from about 0.1 wt. % to about 30 wt. % of a crystalline polyester, or from about 0.1 wt. % to about 40 wt. % of a crystalline polyester, or from about 0.1 wt. % to about 25 wt. % of a crystalline polyester, or from about 0.1 wt. % to about 15 wt. % of a crystalline polyester, or from about 1 wt. % to about 15 wt. % of a crystalline polyester, or from about 1 wt. % to about 20 wt. % of a crystalline polyester, or from about 0.5 wt. % to about 12 wt. % of a crystalline polyester. The polymer composition may comprise from about 0.1 wt. % to about 70 wt. % of a crystalline polyester.

In an aspect, the disclosed composition may comprise a polyetherimide which can be of formula (H):

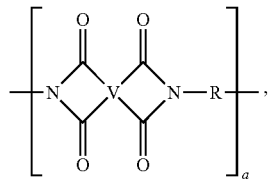

(H)

wherein a is more than 1, for example 10 to 1,000 or more, or more specifically 10 to 500. In a specific aspect, the polyetherimide is an aromatic polyetherimide.

The group V in formula (H) is a tetravalent linker containing an ether group (a "polyetherimide" as used herein) or a combination of an ether groups and arylenesulfone groups (a "polyetherimidesulfone"). Such linkers include but are not limited to: (a) substituted or unsubstituted, saturated, unsaturated or aromatic monocyclic and polycyclic groups having 5 to 50 carbon atoms, optionally substituted with ether groups, arylenesulfone groups, or a combination of ether groups and arylenesulfone groups; and (b) substituted or unsubstituted, linear or branched, saturated or unsaturated alkyl groups having 1 to 30 carbon atoms and optionally substituted with ether groups or a combination of ether groups, arylenesulfone groups, and arylenesulfone groups; or combinations including at least one of the foregoing. Suitable additional substitutions include, but are not limited to, ethers, amides, esters, and combinations including at least one of the foregoing.

The R group in formula (H) can include but is not limited to substituted or unsubstituted divalent organic groups such as: (a) aromatic hydrocarbon groups having 6 to 20 carbon atoms and halogenated derivatives thereof, (b) straight or branched chain alkylene groups having 2 to 20 carbon atoms; (c) cycloalkylene groups having 3 to 20 carbon atoms, or (d) divalent groups of formula (I):

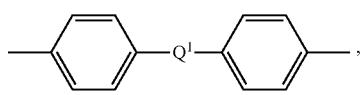

(I)

wherein Q1 includes but is not limited to a divalent moiety such as —O—, —S—, —C(O)—, —SO$_2$—, —SO—, —C$_y$H$_{2y}$— (y being an integer from 1 to 5), and halogenated derivatives thereof, including perfluoroalkylene groups.

In an aspect, linkers V can include but are not limited to tetravalent aromatic groups of formula (J):

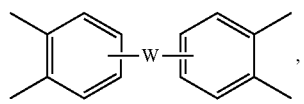

(J)

wherein W is a divalent moiety including —O—, —SO$_2$—, or a group of the formula —O—Z—O— wherein the divalent bonds of the —O— or the —O—Z—O— group are in the 3,3', 3,4', 4,3', or the 4,4' positions, and wherein Z includes, but is not limited, to divalent groups of formulas (K):

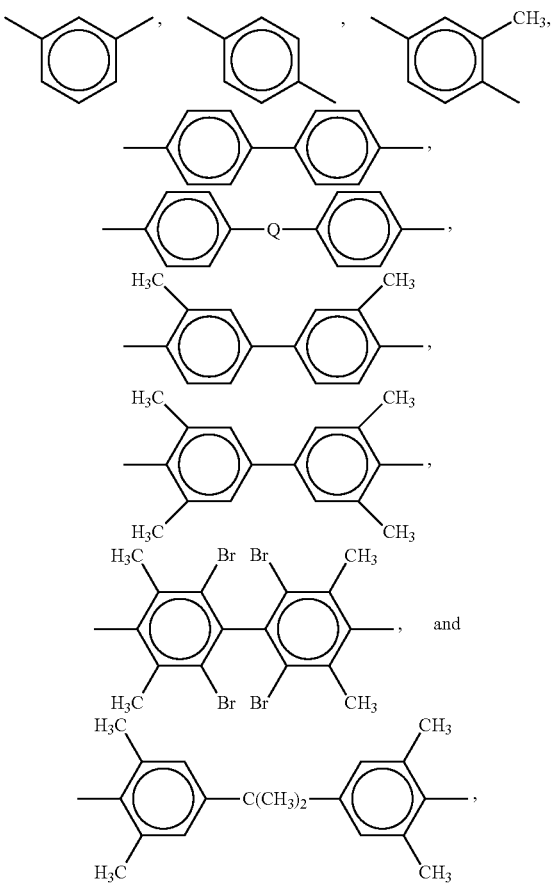

(L)

wherein Q can include, but is not limited to a divalent moiety including —O—, —S—, —C(O), —SO$_2$—, —SO—, —C$_y$H$_{2y}$— (y being an integer from 1 to 5), and halogenated derivatives thereof, including perfluoroalkylene groups.

In an aspect, the polyetherimide include more than 1, specifically 10 to 1,000, or more specifically, 10 to 500 structural units, of formula (L):

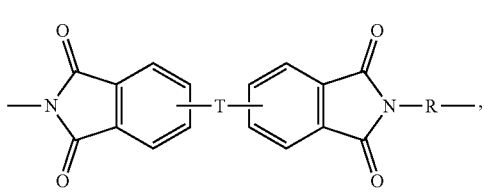

(L)

wherein T is —O— or a group of the formula —O—Z—O— wherein the divalent bonds of the —O— or the —O—Z—O— group are in the 3,3', 3,4', 4,3', or the 4,4' positions; Z is a divalent group of formula (H) as defined above; and R is a divalent group of formula (8) as defined above.

In another aspect, the polyetherimidesulfones can be polyetherimides including ether groups and sulfone groups.

Even more specifically, polyetherimidesulfones can include more than 1, specifically 10 to 1,000, or more specifically, 10 to 500 structural units of formula (M):

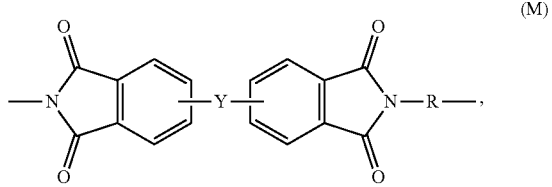

wherein Y is —O—, —SO$_2$—, or a group of the formula —O—Z—O— wherein the divalent bonds of the —O—, SO$_2$—, or the —O—Z—O— group are in the 3,3', 3,4', 4,3', or the 4,4' positions, wherein Z is a divalent group of formula (8) as defined above and R is a divalent group of formula (6) as defined above, provided that greater than 50 mole % of the sum of moles Y+moles R in formula (6) contain —SO$_2$— groups.

It is to be understood that the polyetherimides and polyetherimidesulfones can optionally include linkers V that do not contain ether or ether and sulfone groups, for example linkers of formula (N):

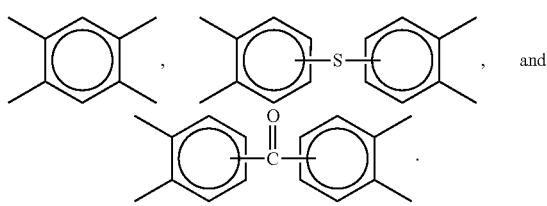

Imide units containing such linkers can generally be present in amounts ranging from 0 to 10 mole % of the total number of units, specifically 0 to 5 mole %. In one aspect no additional linkers V are present in the polyetherimides and polyetherimidesulfones.

The polyetherimide resin can be selected from the group consisting of a polyetherimide, for example, as described in U.S. Pat. Nos. 3,875,116, 6,919,422, and 6,355,723; a silicone polyetherimide, for example, as described in U.S. Pat. Nos. 4,690,997 and 4,808,686; a polyetherimidesulfone resin, as described in U.S. Pat. No. 7,041,773; or combinations thereof. Each of these publications is incorporated by this reference in its entirety.

Suitable polyetherimides that can be used in the disclosed composites include, but are not limited to, ULTEM™ resin. ULTEM™ resin is a polymer from the family of polyetherimides (PEI) sold by Saudi Basic Industries Corporation (SABIC). ULTEM™ resin can have elevated thermal resistance, high strength and stiffness, and broad chemical resistance. ULTEM™ resin as used herein refers to any or all ULTEM™ polymers included in the family unless otherwise specified. In a further aspect, the ULTEM™ resin is ULTEM™ 1010. In one aspect, a polyetherimide can comprise any polycarbonate material or mixture of materials, for example, as recited in U.S. Pat. Nos. 4,548,997; 4,629,759; 4,816,527; 6,310,145; and 7,230,066, all of which are hereby incorporated in its entirety for the specific purpose of disclosing various polyetherimide compositions and methods.

In a further aspect, the polyetherimide resin has a weight average molecular weight (Mw) of at least about 24,000 to about 150,000 grams per mole (g/mole), as measured by gel permeation chromatography, using a polystyrene standard.

In a further aspect, the thermoplastic resin can comprise a polyetherimide polymer having a molecular weight of at least 40,000 Daltons, 50,000 Daltons, 60,000 Daltons, 80,000 Daltons, or 100,000 Daltons. In a yet further aspect, polyetherimide polymer has a molecular weight of at least Daltons, 40,000 Daltons or 50,000 Daltons. In a still further aspect, the polyetherimide polymer has a molecular weight of at least 40,000 Daltons. In a yet further aspect, the polyetherimide polymer has a molecular weight of at least 50,000 Daltons. In an even further aspect, the polyetherimide polymer has a molecular weight of at least 60,000 Daltons. In a still further aspect, the polyetherimide polymer has a molecular weight of at least 70,000 Daltons. In a yet further aspect, the polyetherimide polymer has a molecular weight of at least 100,000 Daltons.

Certain aspects of the composition include from about 1 wt. % to about 99 wt. % of a polyetherimide resin. In further aspects, the composition includes from about 20 wt. % to about 80 wt. % of a polyetherimide resin, or from about 30 wt. % to about 50 wt. % of a polyetherimide resin, or from about 30 wt. % to about 45 wt. % of a polyetherimide resin. The polyetherimide resin may be present in the polymer composition in the range of from at least about 45 wt. % to about 85 wt. %, In further examples, the composition may comprise from about 10 wt. % to about 90 wt. % of a polyetherimide resin, or from about 10 wt. % to about 80 wt. % of a polyetherimide resin, or from about 20 wt. % to about 80 wt. % of a polyetherimide resin, or from about 25 wt. % to about 80 wt. % of a polyetherimide resin, or from about 30 wt. % to about 80 wt. % of a polyetherimide resin, or from about 40 wt. % to about 80 wt. % of a polyetherimide resin, or from about 40 wt. % to about 75 wt. % of a polyetherimide resin, or from about 45 wt. % to about 80 wt. % of a polyetherimide resin.

Inherently Dissipative Polymer

In various aspects, the disclosed polymer compositions may comprise an inherently dissipative polymer (IDP). An inherently dissipative polymer may refer to a polymer resin having electrostatic dissipative (ESD) properties.

The IDP generally comprises a modified polymer. In certain aspects, the IDP may comprise thermoplastic elastomer, or a modified thermoplastic elastomer. Such materials are generally described as polymers having hard and/or crystalline segments and/or blocks in their backbone structure and having both soft and/or rubbery segments and/or blocks. These may be referred to as multi-block copolymer.

The IDP disclosed herein may be ion-doped. Conventionally, IDP may be sodium ion-doped. IDP of the present disclosure may be phosphonium ion-doped.

In some aspects, the inherently dissipative polymer comprises a thermoplastic polyurethane (TPU), a polyolefin polyether copolymer, a thermoplastic polyester elastomer (COPE), a polyether block amide elastomer (COPA or PEBA), or a combination thereof. Examples of suitable copolymers include polyolefin-polyether copolymers.

As an example, the polymer compositions may include IDP comprising a nylon (or polyamide) based multi-block copolymer doped with ions, such as commercially available Pelectron™ AS or TPA6060. By its nature common nylon based IDP is detrimental to PC causing a degradation. However, the specific combination of components of the present disclosure may overcome this potential for degradation. Processing temperatures are desirably maintained as low as possible to prevent IDP reaction with PC and subsequent loss of surface conductivity. The unique composition enables low-temperature processing. As such, processing temperatures may be maintained below 240° C. for extrusion, compounding, or injection molding, particularly for extrusion and injection molding.

As a further example, the polymer compositions may include an IDP comprising a polymeric masterbatches based on polymer resins, such as commercially available avanDISS 378.

The IDP may have a surface resistivity of a magnitude of about E+6 to E+8 ohms (for example, 1×106 ohms to 9×108 ohms. The IDP may have a volume resistivity of about E+4 to E+7 ohms cm (for example, 1×104 ohms to 9×107). The IDP may have a surface resistivity of about $1 \times 10^7$ Ohms when tested in accordance with ASTM D257 on a 68 millimeter (mm)×68 mm×3 mm plaque specimen.

In some aspects, the polymer composition may include from about 0.1 wt. % to about 50 wt. % of an IDP. In further aspects the composition may include from about 10 wt. % to about 50 wt. % of an IDP, or from about 15 wt. % to about 50 wt. % of an IDP, or from about 50 wt. % to about 70 wt. % of an IDP, or from about 18 wt. % to about 40 wt. % of an IDP, or from about 15 wt. % to about 45 wt. % of an IDP, or from about 12 wt. % to about 35 wt. % of an IDP, from about 12 wt. % to about 40 wt. % of an IDP, or from about 12 wt. % to about 50 wt. % of an IDP, or from about 12 wt. % to about 50 wt. % of an IDP.

Transesterification Inhibitor

The polymer composition may comprise one or more transesterification inhibitors. A transesterification inhibitor may prevent ester exchange reaction of polymers thereby inhibiting polymerization reactions. As is also well-known, the presence of transesterification inhibitors can inhibit the polymerization reaction. U.S. Pat. No. 4,069,278 teaches that in the poly condensation of ethylene glycol and dimethyl terephthalate catalyzed by calcium acetate and antimony oxide, no phosphorus containing stabilizers (catalyst inhibitors) were added at any time.

Suitable transesterification inhibitors are well known in the art and can be selected from the group consisting of inhibitors of phosphorous containing stabilizers such as a pentaerythritol diphosphite (GE Specialty Chemicals, Parkersburg, W. Va., Ultranox™ 626), phosphoric acid, and polyphosphoric acid. Other examples are zinc diisopropyl dithiophosphate, tris(2,4-di-t-butylphenyl) phosphite, tris (mononoylphenyl) phosphite and mixtures thereof. Further transesterification inhibitors include sodium dihydrogen phosphate, potassium acetate, trimethyl phosphate and phenylphosphoric acid. Orthophosphoric acids represented by the formula $xH_2O \cdot yP_2O_5$ and satisfying x/y 3, polyphosphoric acids called diphosphoric acid, triphosphoric acid, tetraphosphoric acid and pentaphosphoric acid according to the degree of condensation and satisfying 2DX/y>1 and mixtures thereof are also included. Metaphosphoric acids represented by the formula $xH_2O \cdot yP_2O_5$ and satisfying x/y=1, especially trimetaphosphoric acid and tetrametaphosphoric acid, and ultraphosphoric acids having a net-like structure with part of the phosphorus pentaoxide structure and satisfying 1>x/y>0 (these may be collectively referred to as "metaphosphoric acid-based compounds") are further included. Acid salts and esters of these phosphoric acids are further included. Out of these, cyclic sodium metaphosphate, ultra-region sodium metaphosphate and DHPA are advantageously used.

The transesterification inhibitor may be present in an amount from about 0.001 wt. % to about 10 wt. % based on the total weight of the polymer composition.

White Pigment

In addition to the polycarbonate copolymer, the crystalline polyester, the IDP, and the transesterification inhibitor, the polymer composition of the present disclosure may further include a white pigment. The white pigment can impart the polymer resin composition with opacity or a bright opaque appearance. In further aspects, the white pigment can impart the polymer resin composition with a white or off-white color. Further, these pigments tend to possess high reflectivity to both near infrared (NIR) and visible light. As used herein, reflectivity can refer to the ability to scatter light away from the surface of the material without absorbing the light at a given wavelength.

Suitable white pigments may include titanium dioxide, zinc sulfide (ZnS), tin oxide, aluminum oxide ($AlO_3$), zinc oxide (ZnO), calcium sulfate, barium sulfate ($BaSO_4$), calcium carbonate (e.g., chalk), magnesium carbonate, antimony oxide ($Sb_2O_3$), white lead (a basic lead carbonate, $2PbCO_3 \cdot Pb(OH)_2$), lithopone (a combination of barium sulfate and zinc sulfide), sodium silicate, aluminum silicate, silicon dioxide ($SiO_2$, silica), mica, clay, talc, metal doped versions of the foregoing materials, and combinations including at least one of the foregoing materials. More particularly, the inorganic white pigment is selected from rutile or anatase titanium dioxide, zinc sulfide, and coated versions thereof such as silanized titanium dioxide. A combination of different types of white pigment can be used. In particular aspects, the white pigment can include titanium dioxide, antimony oxide, zinc oxide, white lead, or lithopone. In some aspects of the present disclosure, talc may be used as a white pigment. Talc may be a suitable white pigment where the material has a sufficiently high color coordinate value to lend the material a white color. In one example, talc having a value of the color coordinate *L (corresponding to the whiteness of a given material) that is greater than 80 would be an appropriate white pigment as described herein.

The white pigment may have an average particle size of 0.01 to 10 micrometers (μm), specifically 0.05 μm to 1 μm, and more particularly 0.1 μm to 0.6 μm. The white pigment can be present in an amount of from about 0.1 wt. % to about 50 wt. %. As an example, the composition may include titanium dioxide in an amount of between 0.1 wt. % and 50 wt. %. In a further example, the composition may include titanium dioxide in an amount between 0.1 wt. % and 20 wt. 0.

Optical Agent

In further aspects of the present disclosure, the polymer compositions can include an optical agent. The optical agent may include an optical brightener. Examples of optical brighteners include optical brightening agents (OBAs), fluorescent brightening agents (FBAs), fluorescent whitening agents (FWAs), or the like, or a combination including at least one of the foregoing optical brighteners. As used herein, optical brighteners refer to dyes absorbing light in the ultraviolet and violet region (usually about 340 to about 370 nm) of the electromagnetic spectrum, and re-emit light in the blue region (usually about 420 to about 470 nm). These additives are often used to enhance the appearance of color of a polymer composition, causing a perceived "whitening" effect. According to the perceived whitening effect, a given material can appear less yellow by increasing the overall amount of blue light reflected. Exemplary optical brighteners are triazine-stilbenes (di-, tetra- or hexasulfonated), coumarins, imidazolines, diazoles, triazoles, benzoxazolines, biphenyl-stilbenes, or the like or a combination including at least one of the foregoing optical brighteners. In particular aspects of the present disclosure, the optical agent may include, but is not limited to, 4,4'-bis(2-benzoxazolyl)stilbene, available commercially as Eastman Eastobrite™ OB-1, or 2,5-bis(5-tert-butyl-2-benzoxazolyl) thiophene, available commercial Tinopal™ OB, as or a combination thereof.

In certain aspects the composition includes from about 0.001 wt. % to about 10 wt. % of an optical brightening agent. In further aspects the composition includes from about 0.01 wt. % to about 5 wt. % of an optical brightening agent, or from about 0.01 wt. % to about 1 wt. % of an optical brightening agent.

Additives

The disclosed thermoplastic composition can include one or more additives conventionally used in the manufacture of molded thermoplastic parts with the proviso that the optional additives do not adversely affect the desired properties of the resulting composition. Mixtures of optional additives can also be used. Such additives can be mixed at a suitable time during the mixing of the components for forming the composite mixture. Exemplary additives can include ultraviolet agents, ultraviolet stabilizers, heat stabilizers, antistatic agents, anti-microbial agents, anti-drip agents, radiation stabilizers, pigments, dyes, fibers, fillers, plasticizers, fibers, flame retardants, antioxidants, lubricants, wood, glass, and metals, and combinations thereof.

The thermoplastic composition disclosed herein can include one or more additional fillers. The filler can be selected to impart additional impact strength and/or provide additional characteristics that can be based on the final selected characteristics of the polymer composition. In some aspects, the filler(s) can include inorganic materials which can include clay, titanium oxide, asbestos fibers, silicates and silica powders, boron powders, calcium carbonates, talc, kaolin, sulfides, barium compounds, metals and metal oxides, wollastonite, glass spheres, glass fibers, flaked fillers, fibrous fillers, natural fillers and reinforcements, and reinforcing organic fibrous fillers.

Appropriate fillers or reinforcing agents can include, for example, mica, clay, feldspar, quartz, quartzite, perlite, tripoli, diatomaceous earth, aluminum silicate (mullite), synthetic calcium silicate, fused silica, fumed silica, sand, boron-nitride powder, boron-silicate powder, calcium sulfate, calcium carbonates (such as chalk, limestone, marble, and synthetic precipitated calcium carbonates) talc (including fibrous, modular, needle shaped, and lamellar talc), wollastonite, hollow or solid glass spheres, silicate spheres, cenospheres, aluminosilicate or (armospheres), kaolin, whiskers of silicon carbide, alumina, boron carbide, iron, nickel, or copper, continuous and chopped carbon fibers or glass fibers, molybdenum sulfide, zinc sulfide, barium titanate, barium ferrite, barium sulfate, heavy spar, $TiO_2$, aluminum oxide, magnesium oxide, particulate or fibrous aluminum, bronze, zinc, copper, or nickel, glass flakes, flaked silicon carbide, flaked aluminum diboride, flaked aluminum, steel flakes, natural fillers such as wood flour, fibrous cellulose, cotton, sisal, jute, starch, lignin, ground nut shells, or rice grain husks, reinforcing organic fibrous fillers such as poly(ether ketone), polyimide, polybenzoxazole, poly(phenylene sulfide), polyesters, polyethylene, aromatic polyamides, aromatic polyimides, polyetherimides, polytetrafluoroethylene, and poly(vinyl alcohol), as well combinations including at least one of the foregoing fillers or reinforcing agents. The fillers and reinforcing agents can be coated with a layer of metallic material to facilitate conductivity, or surface treated, with silanes for example, to improve adhesion and dispersion with the polymer matrix. Fillers generally can be used in amounts of 1 to 200 parts by weight, based on 100 parts by weight of the total composition.

In some aspects, the thermoplastic composition may include a synergist. In various examples fillers may serve as flame retardant synergists. The synergist facilitates an improvement in the flame retardant properties when added to the flame retardant composition over a comparative composition that contains all of the same ingredients in the same quantities except for the synergist. Examples of mineral fillers that may serve as synergists are mica, talc, calcium carbonate, dolomite, wollastonite, barium sulfate, silica, kaolin, feldspar, barytes, or the like, or a combination including at least one of the foregoing mineral fillers. Metal synergists, e.g., antimony oxide, can also be used with the flame retardant. In one example, the synergist may include magnesium hydroxide and phosphoric acid. The mineral filler may have an average particle size of about 0.1 to about 20 μm, specifically about 0.5 to about 10 μm, and more specifically about 1 to about 3 μm.

The thermoplastic composition can include an antioxidant. The antioxidants can include either a primary or a secondary antioxidant. For example, antioxidants can include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3, 5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate or the like; amides of beta-(3,5-di-tert-butyl-4-hydroxyphenyl)-propionic acid or the like, or combinations including at least one of the foregoing antioxidants. Antioxidants can generally be used in amounts of from 0.01 to 0.5 parts by weight, based on 100 parts by weight of the total composition, excluding any filler.

In various aspects, the thermoplastic composition can include a mold release agent. Exemplary mold releasing agents can include for example, metal stearate, stearyl stearate, pentaerythritol tetrastearate, beeswax, montan wax, paraffin wax, or the like, or combinations including at least one of the foregoing mold release agents. Mold releasing agents are generally used in amounts of from about 0.1 to about 1.0 parts by weight, based on 100 parts by weight of the total composition, excluding any filler.

In an aspect, the thermoplastic composition can include a heat stabilizer. As an example, heat stabilizers can include, for example, organo phosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations including at least one of the foregoing heat stabilizers. Heat stabilizers can generally be used in amounts of from 0.01 to 0.5 parts by weight based on 100 parts by weight of the total composition, excluding any filler.

In further aspects, light stabilizers can be present in the thermoplastic composition. Exemplary light stabilizers can include, for example, benzotriazoles such as 2-(2-hydroxy- 5-methylphenyl)benzotriazole, 2-(2-hydroxy-5-tert-octylphenyl)-benzotriazole and 2-hydroxy-4-n-octoxy benzophenone or the like or combinations including at least one of the foregoing light stabilizers. Light stabilizers can generally be used in amounts of from about 0.1 to about 1.0 parts by weight, based on 100 parts by weight of the total composition, excluding any filler.

The thermoplastic composition can also include plasticizers. For example, plasticizers can include phthalic acid esters such as dioctyl-4,5-epoxy-hexahydrophthalate, tris-(octoxycarbonylethyl) isocyanurate, tristearin, epoxidized soybean oil or the like, or combinations including at least one of the foregoing plasticizers. Plasticizers are generally used in amounts of from about 0.5 to about 3.0 parts by weight, based on 100 parts by weight of the total composition, excluding any filler.

In further aspects, the disclosed composition can include antistatic agents. These antistatic agents can include, for example, glycerol monostearate, sodium stearyl sulfonate, sodium dodecylbenzenesulfonate or the like, or combinations of the foregoing antistatic agents. In one aspect, carbon fibers, carbon nanofibers, carbon nanotubes, carbon black, or any combination of the foregoing can be used in a polymeric resin containing chemical antistatic agents to render the composition electrostatically dissipative.

Ultraviolet (UV) absorbers can also be present in the disclosed thermoplastic composition. Exemplary ultraviolet absorbers can include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations including at least one of the foregoing UV absorbers. UV absorbers are generally used in amounts of from 0.01 to 3.0 parts by weight, based on 100 parts by weight of the total composition, excluding any filler.

The thermoplastic composition can further include a lubricant. As an example, lubricants can include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers thereof e.g., methyl stearate and polyethylene-polypropylene glycol copolymers in a suitable solvent; or combinations including at least one of the foregoing lubricants. Lubricants can generally be used in amounts of from about 0.1 to about 5 parts by weight, based on 100 parts by weight of the total composition, excluding any filler.

Anti-drip agents can also be used in the composition, for example a fibril forming or non-fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. In one example, TSAN can include 50 wt. % PTFE and 50 wt. % SAN, based on the total weight of the encapsulated fluoropolymer. The SAN can include, for example, 75 wt. % styrene and 25 wt. % acrylonitrile based on the total weight of the copolymer. An anti-drip agent, such as TSAN, can be used in amounts of 0.1 to 10 parts by weight, based on 100 parts by weight of the total composition, excluding any filler.

As an example, the disclosed composition can include an impact modifier. The impact modifier can be a chemically reactive impact modifier. By definition, a chemically reactive impact modifier can have at least one reactive group such that when the impact modifier is added to a polymer composition, the impact properties of the composition (expressed in the values of the IZOD impact) are improved. In some examples, the chemically reactive impact modifier can be an ethylene copolymer with reactive functional groups selected from, but not limited to, anhydride, carboxyl, hydroxyl, and epoxy.

In further aspects of the present disclosure, the composition can include a rubbery impact modifier. The rubber impact modifier can be a polymeric material which, at room temperature, is capable of recovering substantially in shape and size after removal of a force. However, the rubbery impact modifier should typically have a glass transition temperature of less than 0° C. In certain aspects, the glass transition temperature ($T_g$) can be less than −5° C., −10° C., −15° C., with a $T_g$ of less than −30° C. typically providing better performance. Representative rubbery impact modifiers can include, for example, functionalized polyolefin ethylene-acrylate terpolymers, such as ethylene-acrylic esters-maleic anhydride (MAH) or glycidyl methacrylate (GMA). The functionalized rubbery polymer can optionally contain repeat units in its backbone which are derived from an anhydride group containing monomer, such as maleic anhydride. In another scenario, the functionalized rubbery polymer can contain anhydride moieties which are grafted onto the polymer in a post polymerization step.

In one example, the composition can include a core-shell copolymer impact modifier having about 80 wt. % of a core including poly(butyl acrylate) and about 20 wt. % of a shell including poly(methyl methacrylate). In a further example, the impact modifier can include an acrylic impact modifier such as ethylene-ethylacrylate copolymer with an ethyl acrylate content of less than 20 wt. % (such as EXL 3330 as supplied by SABIC). The composition can include about 5 wt. % of the ethylene-ethylacrylate copolymer.

In many aspects, the compositions can be prepared according to a variety of methods. The compositions of the present disclosure can be blended, compounded, or otherwise combined with the aforementioned ingredients by a variety of methods involving intimate admixing of the materials with any additional additives desired in the formulation. Because of the availability of melt blending equipment in commercial polymer processing facilities, melt processing methods can be used. In various further aspects, the equipment used in such melt processing methods can include, but is not limited to, co-rotating and counter-rotating extruders, single screw extruders, co-kneaders, disc-pack processors and various other types of extrusion equipment. In a further aspect, the extruder is a twin-screw extruder. In various further aspects, the composition can be processed in an extruder at temperatures from about 180° C. to about 350° C., particularly 250° C. to 300° C.

Properties and Articles

In various aspects, the disclosed compositions combine IDP, polyetherimide, and a crystalline polymer to provide desirable ESD properties while also maintain a broad color space. The disclosed compositions also achieve balanced performance in electrical, aesthetics, impact and processing by the combined merits of crystalline polymers and amorphous PEI polymer.

In certain aspects, the compositions may exhibit electrostatic dissipative properties. For example, in some aspects, the compositions may exhibit a surface resistivity less than $9\times10^{10}$ ohms or a surface resistivity of from $1\times10^9$ ohms to $9\times10^{10}$ ohms when measured in accordance with ASTM D257 and a volume resistivity of from $1\times10^8$ to $9\times10^9$ ohms cm in accordance with ASTM D257.

As provided herein, compositions of the present disclosure are colorable. Colorable may describe the ease of coloring of the polymer composition. That is, the polymer composition may be sufficiently "light" in color to accept dyes, pigments, or other color treatments/additives that impart a desired hue to the composition. Conventional dissipative materials often include dissipative additives that are dark in color such as carbon fiber or carbon black. As such the color space for conventional ESD materials may be limited. The disclosed compositions may alleviate these restrictions as they achieve surface resistivities less than $9\times10^{10}$ ohms or between $1\times10^9$ ohms and $9\times10^{10}$ ohms when tested in accordance with ASTM D257, while also being colorable. Values of the present disclosure have certain values for certain colorimetric coordinates L*, a*, b*. The "L* value" describes the lightness-darkness property. If the L* value is 0, the object is black. If the L* value is 100 the object is white. The L* value is always positive. Compositions having an L* value further away from the extremes (0 and 100) have a more natural color, which may be the selected color for a specific application or which may enable the composition to be more easily colored. Having values further away from 0 and closer to 100 for L* results in a composition that has a much wider "color space". The "color space" is the range of L* that can be achieved using an optional colorant, pigment and/or dye. L* may be measured using ASTM 2244 with 10 degree observer; International Commission on Illumination (CIE) Standard Illuminant D65 illuminant; specular component included (SCI) reflectance; and large aperture). The polymer composition may exhibit an L* color value of at least about 50 or at least about 80 or at least about 90 when measured using a spectrophotometer with D65 illumination in a 10° observer in reflection mode.

The compositions may exhibit a heat deflection temperature of at least 140° C. when tested in accordance with ASTM D648 at 0.45 megapascals (MPa) and a specimen thickness of 3.2 mm.

These compositions are thus a suitable candidate for consumer electronics/semi-conductor/construction applications and enable a critical capability to be made into ESD products with customized color. Furthermore, these compositions demonstrate the potential to replace carbon fiber, conductive carbon black, graphite, graphene, carbon nano tube, etc., filled ESD materials in the market.

In various aspects, the present disclosure relates to articles including the compositions herein. The compositions can be molded into useful shaped articles by a variety of means such as injection molding, extrusion, rotational molding, blow molding and thermoforming to form articles. The compositions can be useful in the manufacture of articles requiring materials with high modulus, good flow, good impact strength, thermal conductivity, and reflectivity.

The advantageous characteristics of the compositions disclosed herein can make them appropriate for an array of uses. Formed articles can include, but are not limited to, personal computers, notebook and portable computers, cell phone antennas and other such communications equipment, medical applications, RFID applications, automotive applications, and the like. In various further aspects, the article can be appropriate as a computer and business machine housing such as a housing for high end laptop personal computers, monitors, robotics, a hand held electronic device housing (such as a housing or flash holder for smart phones, tablets, music devices), electrical connectors, LED heat sink, and components of lighting fixtures, wearables, ornaments, home appliances, and the like.

In a further aspect, non-limiting examples of fields in which the thermoplastic compositions can be employed can include electrical, electro-mechanical, radio frequency (RF) technology, telecommunication, automotive, aviation, medical, sensor, military, and security. In a still further aspect, the thermoplastic compositions can also be present in overlapping fields, such as mechatronic systems that integrate mechanical and electrical properties which can, for example, be used in automotive or medical engineering.

In a further aspect, the suitable article can be an electronic device, automotive device, telecommunication device, medical device, security device, or mechatronic device. In a still further aspect, the article can be selected from a computer device, electromagnetic interference device, printed circuit, Wi-Fi device, Bluetooth device, GPS device, cellular antenna device, smart phone device, automotive device, medical device, sensor device, security device, shielding device, RF antenna device, LED device, and RFID device. In yet a further aspect, the article can be selected from a computer device, sensor device, security device, RF antenna device, LED device and RFID device.

In a further aspect, the molded articles can be used to manufacture devices in the automotive field. In a still further aspect, non-limiting examples of such devices in the automotive field which can use the disclosed blended thermoplastic compositions in the vehicle's interior include adaptive cruise control, headlight sensors, windshield wiper sensors, and door/window switches. In a further aspect, non-limiting examples of devices in the automotive field which can the disclosed blended thermoplastic compositions in the vehicle's exterior include pressure and flow sensors for engine management, air conditioning, crash detection, and exterior lighting fixtures.

In a further aspect, the resulting disclosed compositions can be used to provide any desired shaped, formed, or molded articles. For example, the disclosed compositions can be molded into useful shaped articles by a variety of means such as injection molding, extrusion, rotational molding, blow molding and thermoforming. As noted above, the disclosed compositions are particularly well suited for use in the manufacture of electronic components and devices. As such, according to some aspects, the disclosed compositions can be used to form articles such as printed circuit board carriers, burn in test sockets, flex brackets for hard disk drives, and the like.

Aspects

Aspect 1A. A polymer composition comprising: from about 1 wt. % to about 99 wt. % of a polyetherimide resin; from about 1 wt. % to about 70 wt. % of a crystalline polyester resin; from about 0.1 wt. % to about 50 wt. % of an inherently dissipative polymer; and from about 0.001 wt. % to about 10 wt. % of a transesterification inhibitor, wherein the polymer composition exhibits a surface resistivity less than $9\times10^{10}$ ohms or a surface resistivity of from $1\times10^9$ ohms to $9\times10^{10}$ ohms when measured in accordance with ASTM D257 and a volume resistivity of from $1\times10^8$ to $9\times10^9$ ohms-cm in accordance with ASTM D257, and wherein the combined weight percent value of all components does not exceed about 100 wt. %, and all weight percent values are based on the total weight of the polymer composition.

Aspect 1B. A polymer composition consisting of: from about 1 wt. % to about 99 wt. % of a polyetherimide resin; from about 1 wt. % to about 70 wt. % of a crystalline polyester resin; from about 0.1 wt. % to about 50 wt. % of an inherently dissipative polymer; and from about 0.001 wt. % to about 10 wt. % of a transesterification inhibitor, wherein the polymer composition exhibits surface resistivity less than $9\times10^{10}$ ohms or a surface resistivity of from $1\times10^9$ ohms to $9\times10^{10}$ ohms when measured in accordance with ASTM D257 and a volume resistivity of from $1\times10^8$ to $9\times10^9$ ohms cm in accordance with ASTM D257, and wherein the combined weight percent value of all components does not exceed about 100 wt. %, and all weight percent values are based on the total weight of the polymer composition.

Aspect 1C. A polymer composition consisting essentially of: from about 1 wt. % to about 99 wt. % of a polyetherimide resin; from about 1 wt. % to about 70 wt. % of a crystalline polyester resin; from about 0.1 wt. % to about 50 wt. % of an inherently dissipative polymer; and from about 0.001 wt. % to about 10 wt. % of a transesterification inhibitor, wherein the polymer composition exhibits surface resistivity less than $9\times10^{10}$ ohms or a surface resistivity of from $1\times10^9$ ohms to $9\times10^{10}$ ohms when measured in accordance with ASTM D257 and a volume resistivity of from $1\times10^8$ to $9\times10^9$ ohms cm in accordance with ASTM D257, and wherein the combined weight percent value of all components does not exceed about 100 wt. %, and all weight percent values are based on the total weight of the polymer composition.

Aspect 2. The polymer composition of any one of aspects 1A-1C, wherein the polyetherimide resin has a flow rate of from about 8 cm³/10 min to about 20 cm³/10 min at 340° C./5.0 kg.

Aspect 3. The polymer composition of any one of claims 1A-2, wherein the polyester resin comprises polybutylene terephthalate, polyethylene terephthalate, or 1,4-cyclohexanedimethyl-1,4-cyclohexanedicarboxylate), or a combination thereof.

Aspect 4. The polymer composition of any one of claims 1A-3, wherein the inherently dissipative polymer is ion-doped.

Aspect 5. The polymer composition of any one of claims 1A-3, wherein the inherently dissipative polymer comprises a nylon-based multi-block copolymer doped with ions.

Aspect 6. The polymer composition of any one of claims 1A-5, wherein the inherently dissipative polymer has a surface resistivity of about $1\times10^7$ when tested in accordance with ASTM D257.

Aspect 7. The polymer composition of any one of claims 1A-6, wherein the transesterification inhibitor comprises mono zinc phosphate, a mixture of mono- and di-stearyl acid phosphate, or a combination thereof.

Aspect 8. The polymer composition of any one of claims 1A-7, wherein the polymer composition exhibits a surface resistivity from $1\times10^6$ and $1\times10^{10}$ Ohms when measured in accordance with ASTM D257.

Aspect 9. The polymer composition of any one of claims 1A-8, wherein the polymer composition exhibits an L* color value of at least about 80 when measured on a spectrophotometer with D65 illumination in a 100 observer in reflection mode.

Aspect 10. The polymer composition of any one of claims 1A-9, wherein the polymer composition is free of or substantially free of carbon fiber, conductive carbon black, graphite, graphene, carbon nanotubes and carbon nanostructure.

Aspect 11. The polymer composition of any one of claims 1A-10, wherein the polymer composition further comprises an additional crystalline polymer comprising polyethylene or polypropylene.

Aspect 12. The polymer composition of any one of claims 1A-10, wherein the polymer composition further comprises an impact modifier.

Aspect 13. The polymer composition of any one of claims 1A-12, wherein the polymer composition exhibits a heat deflection temperature of at least 140° C. when tested in accordance with ASTM D648 at 0.45 MPa and a specimen thickness of 3.2 mm.

Aspect 14. The polymer composition of any of claims 1A-13, wherein the composition further comprises an optical brightening agent.

Aspect 15. The polymer composition of any of claims 1A-14, wherein the polymer composition further comprises an additive.

Aspect 16. The polymer composition of any one of aspects 1A-15, wherein the polyetherimide is an aromatic polyetherimide.

EXAMPLES

Detailed aspects of the present disclosure are disclosed herein; it is to be understood that the disclosed aspects are merely exemplary of the disclosure that may be embodied in various forms. Therefore, specific structural and functional details disclosed herein are not to be interpreted as limits, but merely as a basis for teaching one skilled in the art to employ the present disclosure. The specific examples below will enable the disclosure to be better understood. However, they are given merely by way of guidance and do not imply any limitation.

The following examples are provided to illustrate the compositions, processes, and properties of the present disclosure. The examples are merely illustrative and are not intended to limit the disclosure to the materials, conditions, or process parameters set forth therein.

General Materials and Methods

The compositions as set forth in the Examples below were prepared from the components presented in Table 1 (shown in FIG. 1).

The compositions as set forth in the Examples herein were prepared from the components presented in Table 1. Formulations were prepared by extruding the pre-blended components using a twin extruder. The polymer base resins (polycarbonate and polyester), IDP, inhibitor and additives are pre-mixed and fed via the main throat. The extrudate was cooled using a water bath prior to pelletizing. Components were compounded using a Toshiba™ TEM-37BS Twin Screw Extruder co-rotating twin screw extruder at between 240° C. and 250° C. The compounding and molding conditions used are shown in Tables 2 and 3 (as shown in FIGS. 2 and 3, respectively). Processing temperatures were maintained as low possible, as IDP degrades at the conventional processing temperature of PEI (specifically, at temperatures greater than 300° C.). This is a technical hurdle which has been overcome by the unique composition enabling low-temperature processing for intrinsically high heat and low flow PEI as in this disclosure.

Molded samples were tested in accordance with the standards presented in table 4 (shown in FIG. 4). Optical properties, such as color and reflectivity, were measured on a ColorEye™ 7000A with D65 illumination in a 100 observer in reflection mode. Assessments were made according to the International Commission on Illumination (CIE) providing values for colorimetric coordinates L*, a*, b*. The coordinates correspond to different color attributes: a* represents redness and green; b*, yellow and blue; and L*, whiteness. Values of L* range between 0 and 100. Lower L* values correspond to darkness of a material while values of L* greater than 70 correspond to materials appearing white to the naked eye.

The notched Izod impact ("NII") test was carried out in accordance with ASTM D256 on 63.5 mm×12.7 mm×3.2 mm molded samples (bars) at 25° C. Data units are J/m.

Heat deflection temperature was determined per ASTM D 648 with flatwise specimen orientation with a 3.2 mm thick specimen (127 mm×12.7 mm) at 0.45 megapascals (MPa). Data are provided in units of ° C.

Comparative samples C-1 was prepared to assess the performance of formulations with and without the transesterification inhibitor. Comparative sample C-0 also did not include the polyester PBT 315. Table 5 (shown in FIG. 5) presents the formulations and surface resistivity observed.

As shown in EX-1-4 in Table 5, crystalline polymers PBT or PET to lower the processing temperature (240° C. for compounding and molding as in Table 2 and 3), because these polymers are less viscous. Compared to EX-1-4, the conventional ESD/anti-static formulation comprising carbon fiber-filled PEI (control sample C-1, commercially available as EE004) required processing temperatures over 330° C. This resulted in much higher energy consumption. The inventive samples were processed at a much lower temperature, which kept the IDP intact during such low-temperature processing so that ESD/anti-static features were maintained. The surface resistivity EX1-EX3 in Table 5 are all at least $1\times10^{10}$ Ohms, indicating they were suitable for anti-static applications. Furthermore, the volume resistivity were at $1\times10^8$ to $1\times10^9$ Ohms level, implying a potential to further lower the surface resistivity if additional IDP could be expelled from core to part surface. This was evidenced by increasing the PBT content to 15 wt. % as in EX-4. Here, the surface resistivity was further lowered to $2.3\times10^9$ ohms/sq. The high heat feature was also maintained as demonstrated by the high HDT (140-158° C.) shown in Table 5. A high flow was also achieved as EX 1-4 can be processed at 240° C., and the MVR for EX-4 is 1.52 at 240° C./2.16 kg).

Samples were also evaluated for optical properties via visual inspection with the naked eye and via spectrophotometer. Another crucial feature of the formulations is that the appearance of all the listed blends are colorless.

Figure 6A:
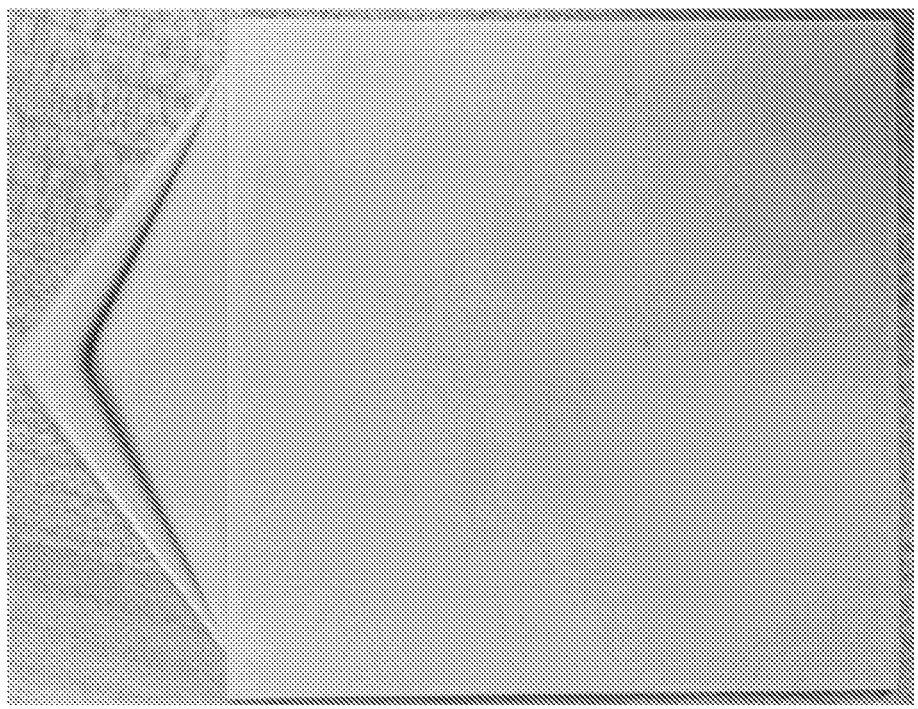
FIG. 6A shows an image of a molded plate comprising sample EX-1.

As shown in FIG. 6A, the plate by PEI/PBT/IDP blend (left) appeared to be a very light brown upon visual inspection thereby enabling further coloring. Indeed, a plate comprised of the disclosed composition appeared even whiter than neat PEI resin which appeared more amber. A conventional ESD PEI material (shown in FIG. 6B) was completely black with no appreciable color space. The L* values shown in Table 5 quantitatively demonstrated the potential for inventive samples to be colored. The L* value of EX-1 was 82.6, which implied a high potential to be further colored. Comparatively control sample C-1 (carbon fiber-filled PEI), exhibited an L* value of 26. This darkness inhibited any further color space.

The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A polymer composition comprising:
   from about 40 wt. % to about 80 wt. % of a polyetherimide resin;
   from about 1 wt. % to about 40 wt % of a crystalline polyester resin;
   from about 15 wt. % to about 45 wt. % of an inherently dissipative polymer; and
   from about 0.001 wt. % to about 10 wt. % of a transesterification inhibitor,
   wherein the polymer composition exhibits a surface resistivity of from $1\times10^9$ ohms to $9\times10^{10}$ ohms when measured in accordance with ASTM D257 and a volume resistivity of from $1\times10^8$ to $9\times10^9$ ohms cm in accordance with ASTM D257, and
   wherein the combined weight percent value of all components does not exceed about 100 wt. %, and all weight percent values are based on the total weight of the polymer composition.

2. The polymer composition of claim 1, wherein the polyetherimide resin has a flow rate of from about 8 cm³/10 min to about 20 cm³/10 min at 340° C./5.0 kg.

3. The polymer composition of claim 1, wherein the crystalline polyester resin comprises polybutylene terephthalate, polyethylene terephthalate, or 1,4-cyclohexanedimethyl-1,4-cyclohexanedicarboxylate), or a combination thereof.

4. The polymer composition of claim 1, wherein the inherently dissipative polymer is ion-doped.

5. The polymer composition of claim 1, wherein the inherently dissipative polymer comprises a nylon-based multi-block copolymer doped with ions.

6. The polymer composition of claim 1, wherein the inherently dissipative polymer has a surface resistivity of about $1\times10^7$ when tested in accordance with ASTM D257.

7. The polymer composition of claim 1, wherein the transesterification inhibitor comprises mono zinc phosphate, a mixture of mono- and di-stearyl acid phosphate, or a combination thereof.

8. The polymer composition of claim 1, wherein the polymer composition exhibits an L* color value of at least about 80 when measured on a spectrophotometer with D65 illumination in a 10° observer in reflection mode.

9. The polymer composition of claim 1, wherein the polymer composition is free of or substantially free of carbon fiber, conductive carbon black, graphite, graphene, carbon nanotubes and carbon nano-structure.

10. The polymer composition of claim 1, wherein the polymer composition further comprises an additional crystalline polymer comprising polyethylene or polypropylene.

11. The polymer composition of claim 1, wherein the polymer composition further comprises an impact modifier.

12. The polymer composition of claim 1, wherein the polymer composition exhibits a heat deflection temperature of at least 140° C. when tested in accordance with ASTM D648 at 0.45 MPa and a specimen thickness of 3.2 mm.

13. The polymer composition of claim 1, wherein the composition further comprises an optical brightening agent.

14. The polymer composition of claim 1, wherein the polymer composition further comprises an additive.

15. The polymer composition of claim 1, wherein the polyetherimide is an aromatic polyetherimide.

16. The polymer composition of claim 1, wherein the composition comprises from about 40 wt. % to about 75 wt. % of the polyetherimide resin.

17. The polymer composition of claim 1, wherein the composition comprises from about 45 wt. % to about 80 wt. % of the polyetherimide resin.

18. The polymer composition of claim 1, wherein the composition comprises from about 1 wt. % to about 20 wt. % of the crystalline polyester resin.

19. The polymer composition of claim 1, wherein the composition comprises from about 15 wt. % to about 35 wt. % of the inherently dissipative polymer.

* * * * *